(12) United States Patent
Seifi et al.

(10) Patent No.: US 10,362,291 B2
(45) Date of Patent: Jul. 23, 2019

(54) LIGHT FIELD IMAGING DEVICE

(71) Applicant: THOMSON LICENSING, Issy les Moulineaux (FR)

(72) Inventors: Mozhdeh Seifi, Thorigne-Fouillard (FR); Benoit Vandame, Betton (FR); Valter Drazic, Betton (FR)

(73) Assignee: Interdigital CE Patent Holdings, Paris (FR)

( * ) Notice: Subject to any disclaimer, the term of this patent is extended or adjusted under 35 U.S.C. 154(b) by 249 days.

(21) Appl. No.: 15/176,119

(22) Filed: Jun. 7, 2016

(65) Prior Publication Data

US 2016/0360182 A1  Dec. 8, 2016

(30) Foreign Application Priority Data

Jun. 8, 2015  (EP) .................................... 15305871

(51) Int. Cl.
*H04N 13/00* (2018.01)
*H04N 5/217* (2011.01)
(Continued)

(52) U.S. Cl.
CPC .......... *H04N 13/229* (2018.05); *H04N 5/217* (2013.01); *H04N 5/2254* (2013.01);
(Continued)

(58) Field of Classification Search
CPC .......... H04N 13/0228; H04N 13/0232; H04N 5/378; H04N 5/217; H04N 5/2254; H04N 5/3572; H04N 19/597
(Continued)

(56) References Cited

U.S. PATENT DOCUMENTS 6,476,805 B1 *  11/2002  Shum ........................ G06T 7/97
                                                    345/420
8,228,417 B1 *   7/2012  Georgiev ............... G03B 11/00
                                                    348/335
(Continued)

FOREIGN PATENT DOCUMENTS

CN          102306291       5/2013
GB            2501950      11/2013
WO       WO1998049667     11/1998

OTHER PUBLICATIONS

Levoy et al., "Recording and controlling the 4D light field in a microscope using microlens arrays", Journal of Microscopy, vol. 235, Pt. 2, 2009, pp. 144-162.

(Continued)

*Primary Examiner* — Jefferey F Harold
*Assistant Examiner* — Sean N. Haiem
(74) *Attorney, Agent, or Firm* — Myers Wolin LLC (57) ABSTRACT

A light-field capture device including a photo-sensor, a main lens configured to refract light from a scene towards an image focal field, a micro-lens array positioned in the image focal field between the main lens and the photo-sensor, each micro-lens being configured to project a micro-lens image onto a respective dedicated area of the photo-sensor. The light-field capture device is provided with at least one compressive sensing calculation unit connected to at least one of the dedicated areas and configured to calculate data such as for example standard deviation data representative of the homogeneity of input pixels of said dedicated area, and to provide output data representative of the input pixels of said dedicated area; the output data comprising either a number of output pixels corresponding to the number of (Continued)

input pixels, or a single output pixel, depending on the relative value of the homoegeneity compared with a threshold.

12 Claims, 5 Drawing Sheets

(51) Int. Cl.
    *H04N 5/225*     (2006.01)
    *H04N 5/357*     (2011.01)
    *H04N 19/597*    (2014.01)
    *H04N 13/232*    (2018.01)
    *H04N 13/229*    (2018.01)

(52) U.S. Cl.
    CPC ......... *H04N 5/3572* (2013.01); *H04N 13/232* (2018.05); *H04N 19/597* (2014.11); *H04N 2013/0081* (2013.01)

(58) Field of Classification Search
    USPC ....... 348/49, 302, 231.99, 43, 340; 345/420, 345/426, 419; 382/232, 154
    See application file for complete search history.

(56) References Cited

U.S. PATENT DOCUMENTS

| | | | | |
|---|---|---|---|---|
| 9,197,821 | B2* | 11/2015 | McMahon | H04N 5/2258 |
| 9,232,132 | B1* | 1/2016 | Tseytin | H04N 5/30 |
| 9,235,900 | B2* | 1/2016 | Ciurea | G06T 7/593 |
| 9,638,883 | B1* | 5/2017 | Duparre | G02B 7/003 |
| 2008/0152215 | A1* | 6/2008 | Horie | G02B 27/2214 |
| | | | | 382/154 |
| 2008/0198451 | A1* | 8/2008 | Gohman | G02B 7/102 |
| | | | | 359/432 |
| 2009/0268970 | A1* | 10/2009 | Babacan | H04N 5/772 |
| | | | | 382/232 |
| 2011/0228131 | A1* | 9/2011 | Iwane | H04N 5/23212 |
| | | | | 348/231.99 |
| 2014/0218546 | A1* | 8/2014 | McMahon | H04N 5/2258 |
| | | | | 348/207.1 |
| 2015/0116563 | A1* | 4/2015 | Herman | H03M 7/3062 |
| | | | | 348/302 |
| 2015/0201143 | A1* | 7/2015 | Ono | H04N 5/2254 |
| | | | | 348/302 |
| 2015/0201176 | A1* | 7/2015 | Graziosi | H04N 13/0011 |
| | | | | 348/43 |
| 2015/0234151 | A1* | 8/2015 | Venkataraman | G02B 13/0015 |
| | | | | 348/360 |
| 2015/0286033 | A1* | 10/2015 | Osborne | G02B 13/0015 |
| | | | | 348/345 |

OTHER PUBLICATIONS

Xiao et al., "Advances in three-dimensional integral imaging: sensing, display, and applications", Applied Optics, vol. 52, No. 4, Feb. 1, 2013, pp. 546-560.

Kamal et al., "Joint Low-Rank and Sparse Light Field Modelling for Dense Multiview Data Compression", IEEE International Conference on Acoustics, Speech and Signal Processing, Vancouver, British Columbia, Canada, May 26, 2013, pp. 3831-3835.

Ashok et al., "Compressive Light Field Imaging", Proceedings of SPIE, vol. 7690, 2010, pp. 1-12.

Shum et al., "Survey of Image-Based Representationas and Compression Techniques", IEEE Transactions PN Circuits and Systems for Video Technology, vol. 13, No. 11, Nov. 2003, pp. 1020-1037.

Zhang et al., "A survey on image-based rendering—representation, sampling and compression", Signal Processing: Image Communication, vol. 19, No. 1, 2004, pp. 1-28.

* cited by examiner

LIGHT FIELD IMAGING DEVICE

This application claims the benefit, under 35 U.S.C. § 119 of European Patent Application No. 15305871.4, filed Jun. 8, 2015.

1. TECHNICAL FIELD

The field of the disclosure relates to light-field imaging. More particularly, the disclosure pertains to technologies for acquiring and processing light-field data.

More specifically, aspects of the invention relate to a device and a method for acquiring output data of an image formed on the photo-sensor of a plenoptic device.

2. BACKGROUND ART

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Conventional image capture devices render a three-dimensional scene onto a two-dimensional sensor. During operation, a conventional capture device captures a two-dimensional (2-D) image representing an amount of light that reaches each point on a photo-sensor (or photo-detector) within the device. However, this 2-D image contains no information about the directional distribution of the light rays that reach the photo-sensor (may be referred to as the light-field). Depth, for example, is lost during the acquisition. Thus, a conventional capture device does not store most of the information about the light distribution from the scene.

Light-field capture devices (also referred to as "light-field data acquisition devices") have been designed to measure a four-dimensional (4D) light-field of the scene by capturing the light from different viewpoints of that scene. Thus, by measuring the amount of light traveling along each beam of light that intersects the photo-sensor, these devices can capture additional optical information (information about the directional distribution of the light rays) for providing new imaging applications by post-processing. The information acquired/obtained by a light-field capture device is referred to as the light-field data. Light-field capture devices are defined herein as any devices that are capable of capturing light-field data.

Light-field data processing comprises notably, but is not limited to, generating refocused images of a scene, generating perspective views of a scene, generating depth maps of a scene, generating extended depth of field (EDOF) images, generating stereoscopic images, and/or any combination of these.

Among the several types of light-field capture devices disclosed in background art, the plenoptic devices use a micro-lens array positioned in the image focal field of the main lens, and before a photo-sensor on which one micro-image per micro-lens is projected. The area of the photo-sensor under each micro-lens is, in the background art, referred to as a macropixel. Thus, the plenoptic device generates one micro-lens image at each macropixel. In this configuration, each macropixel depicts a certain area of the captured scene and each pixel of this macropixel depicts this certain area from the point of view of a certain sub-aperture location on the main lens exit pupil.

The raw image of the scene obtained as a result, also referred to as "output data", is the sum of all the micro-lens images acquired from respective portions of the photo-sensor. These output data contain the angular information of the light field. Based on these output data, the extraction of an image of the captured scene from a certain point of view, also called "de-multiplexing" in the following description, can be performed by concatenating the output pixels covered by each micro-lens image. This process can also be seen as a data conversion from the 2D raw image to the 4D light-field.

Due to the considerable amount of data generated by plenoptic devices, the compression of light field data remains an important challenge to overcome in computational photography. A few publications of background art, among which U.S. Pat. Nos. 8,228,417B1, 6,476,805B1 and US20090268970A1, describe various processes intended to reduce the size of the light-field obtained after de-multiplexing the raw image. Such compression methods, even if welcomed in late stages of the image processing, do not contribute in any way to reduce the size of the output data acquired following the capture of a scene by a plenoptic device.

Still, the publication US20090268970A1 describes a light-field preprocessing module adapted to reshape a micro-lens image by cropping it into shapes compatible with the blocking scheme of a block-based compression technique (e.g., squares of size 8×8, 16×16 for JPEG). The first main drawback of such a method is the undifferential suppression for each micro-lens image of all the output pixels (and the corresponding information) located out of the cropping perimeter. Such lost information cannot be recovered in a later stage and shall be made up by the implementation of a heavy resource-consuming interpolation process, which tend to further increase the computation load of the light-field image processing.

The disk model of the micro-lens images depends on the intrinsic parameters of the plenoptic device, as well as the position of the micro-lens image on the photo-sensor. For peripheral parts of the sensor, the vignetting of the main lens is non-symmetric. Besides, the position of the micro-lens images moves on the sensor by changing the zoom/focus parameter of the camera. Therefore, in the methods and devices known of the background art, all the captured pixels (also called "input pixels") have to be stored and transferred to post-processing.

It would hence be desirable to provide a light-field capture device showing improvements of the background art.

Notably, it would be desirable to provide such a device, which would be adapted to reduce the size of the raw image initially stored, while preserving the workable data of the light-field captured, and limiting the computing load of the corresponding processing.

3. SUMMARY OF INVENTION

According to a first aspect of the invention there is provided, a light-field capture device is disclosed, which comprises:
  a photo-sensor,
  a main lens configured to refract light from a scene towards an image focal field,
  a micro-lens array positioned in the image focal field between the main lens and the photo-sensor, each micro-lens being configured to project a micro-lens image onto a respective area of the photo-sensor; wherein the light-field capture device comprises at least one calculation unit connected to at least one of the respective areas and configured to obtain homogeneity data representative of the homogeneity of input pixels of said respective area, and to provide, based on the homogeneity data, output data representative of the input pixels of said respective area; the output data comprising either a number of output pixels corresponding to the number of input pixels, or a single output pixel, depending on a comparison of the homogeneity data with a homogeneity threshold).

In embodiments of the invention the homogeneity data may correspond to the standard deviation (S) of the input pixel values Such a light-field capture device comprises at least one compressive sensing calculation unit connected to at least one of the dedicated areas and configured to calculate a homogeneity metric representative of the homogeneity of the input pixels of said dedicated area, for example the standard deviation of input pixels of said given area, and to provide output data representative of the input pixels of said given area; the output data comprising either a number of output pixels corresponding to the number of input pixels, or a single output pixel, depending on the relative value of the standard deviation compared with a pre-set threshold value on a homogeneity metric.

In the following description, the expression "main lens" refers to an optical system, which receives light from a scene to capture in an object field of the optical system, and renders the light through the image field of the optical system. In one embodiment of the invention, this main lens only includes a single lens. In another embodiment of the invention, the main lens comprises a set of lenses mounted one after the other to refract the light of the scene to capture in the image field. The term "given area" may be referred to as"dedicated area" refers to a specific area of the photo-sensor, whose position on the photo-sensor is set in time. In the following description, this expression is sometimes replaced by the expression "macropixel". One skilled in the art will consider them as equivalent, while keeping in mind that for the present disclosure, the position on the photo-sensor of such a "macropixel" is considered as set in time. The expression "input pixel" refers to the value of intensity captured/measured for each pixel of a macropixel. The expression "output pixel" refers to a value, which depicts the value of intensity of at least one pixel of the macropixel. The sum of the output pixels acquired from a macropixel forms the output data of this macropixel. In one embodiment, the input pixels of a macropixel are separately considered, depending on their color channel, for example in presence of Bayer pattern on the photo-sensor or in presence of a 3(three)-channel acquisition photo-sensor, to account for the color filter transmittances. In such an embodiment, output data are formed for each of the color channels of the macropixel. The expression "standard deviation" refers to a mathematical function that depends on the disparity between the different input pixels of a macropixel. The expression "threshold value on a homogeneity metric" refers to a reference value of the homogeneity between the different input pixels of a macropixel.

The expression "compressive sensing calculation unit" refers to a system, which is configured to calculate the value of the standard deviation function and to provide output data representative of the input pixels. Such output data comprise either one single output pixel or a number of output pixels corresponding to the number of input pixels, based on a comparison between the standard deviation calculated and the threshold value on the homogeneity metric. This system is therefore adapted to reduce the number of output pixels acquired to a single one, when the image formed on the macropixel is considered as homogenous. In this matter, the calculation of the standard deviation is targeted to determine the degree of homogeneity of the image formed on the macropixel, known as the "captured image", while the threshold value on the homogeneity metric tends to set the degree of homogeneity required to consider the captured image as homogeneous. When the compressive sensing calculation unit determines that the captured image does not fulfill this requirement on homogeneity as set, the system does not proceed to the reduction in the number of output pixels, in order to preserve the diversity of the captured pixels. Thus, the workable data and the corresponding precious information intended to be revealed in further processing of the output data, e.g. after de-multiplexing, are safely preserved.

In order to connect physically, e.g. by a wire, the compressive sensing calculation unit to the macropixel to be measured, it is essential to know, when assembling the calculation unit with the photo-sensor, the exact position of this macropixel on the photo-sensor. Since such a position depends on the zoom/focus configuration of the light-field capture device, one skilled in the art will understand that even though the present invention can be embodied by light-field captured devices implementing or not a zoom/focus ability, in the particular case of a device that does embody a zoom/focus ability, a specific kind of field lens must be added into the light-field capture device to carry out the invention, as described in the following description.

Considering the high redundancy of light-field data, embodiments of the present invention allows in frequent cases a reduction in the size of the output data acquired from one macropixel. Moreover, considering that the output data acquired from a scene by a light-field capture device is formed by the sum of the output data acquired from each macropixel of the photo-sensor, embodiments of the invention rely on a novel and inventive approach of acquisition of light-field data by providing a light-field capture device, which is adapted to reduce significantly the size of the raw image initially stored in the non-volatile medium, while preserving the workable data of the light-field captured.

The computation load of the processes implemented based on the output data, e.g. the de-multiplexing process, highly depends on the size of these output data. Therefore, the present disclosure also contributes significantly to limit the computing load of such processes.

In one particular embodiment, the light-field capture device comprises a field lens positioned between the main lens and the micro-lens array and configured to set the angle of refraction of the light refracted by the field lens.

One advantage of this technical feature is that it allows setting in time the position of the macropixels on the photo-sensor, whatever the zoom/focus configuration of the light-field capture device. One skilled in the art is then able to carry out the present disclosure with a light-field capture device that implements a zoom/focus ability.

In one particular embodiment, the field lens comprises a varifocal lens.

Such a varifocal lens is configured to adapt its object focal length in order match the distance between the main lens and the varifocal lens. The exit pupil of the varifocal lens is then placed at infinity, which makes the lens image-space telecentric. In other terms, the light rays that pass through the center of the aperture of the varifocal lens are parallel to the optical axis behind this varifocal lens. The light rays refracted by the micro-lenses are also parallel to the optical axis and perpendicular to the photo-sensor. As a consequence, the respective positions of the macropixels are not only set in time, but also separated one from another, when considering two adjacent macropixels along any direction, by a constant distance. It is therefore easier to determine the exact position of the macropixels on the photo-sensor, prior to the assembling of the light-field capture device.

In one particular embodiment, the compressive sensing calculation unit is also configured to correct the input pixels based on pre-set corrective weights.

One advantage of this technical feature is that the compressive sensing calculation unit is able to correct the vignetting effects of the light-field capture device. Indeed, such vignetting effects depend on the technical features of the main lens and on the positions of the micro-images formed on the photo-sensor. Since such positions are set in time for the present disclosure, the corrective weights to apply respectively to each micro-image to correct the vignetting effects can be measured in advance, and applied to the input pixels, prior to the storing of the output data.

In one particular embodiment, the photo-sensor is positioned at one image focal length from the micro-lens array.

According to this embodiment, the light-field capture device is a plenoptic camera type 1 also known as unfocused plenoptic camera. Such a plenoptic camera has the advantage to have a satisfactory angular resolution.

In one particular embodiment, the light-field capture device comprises a plurality of compressive sensing calculation units, each compressive sensing calculation unit being connected to a single dedicated area.

According to this embodiment, the complexity of the algorithm to correct the vignetting effects is lower than in the case of a compressive sensing calculation unit handling more than one macropixel at a time. Thus, the processing unit of the compressive sensing calculation unit is much simpler and can be easily programmed on a FPGA board.

In one particular embodiment, at least one compressive sensing calculation unit is individually connected to a plurality of dedicated areas of the photo-sensor.

The advantage of such a technical feature is to put one compressive sensing calculation unit in common for a plurality of macropixels, which allows reducing the number of calculation units. In return, the complexity of the algorithm that handles such data increases. The corresponding processing load is therefore higher and requires more on-board memory.

In one aspect of the invention there is provided a method for acquiring output data from a number of input pixels, comprising:
  determining homogeneity data representative of the homogeneity of the input pixels to provide output data representative of the input pixels, wherein
  in the case where the homogeneity data is equal to or greater than a homogeneity threshold, the output data comprise a number of output pixels corresponding to the number of input pixels,
  otherwise, in the case where the homogeneity data is less than the homogeneity threshold, the output data comprise a single output pixel representative of the input pixels.

One skilled in the art will understand that such a method can be implemented on a light-field capture device according to any of the embodiments disclosed in the description.

As pointed out above for a light field capture device according to the present disclosure, this method allows reducing the size of the raw image initially stored, while preserving the workable data of the light field captured, and limiting significantly the computing load of the processes implemented based on the output data acquired.

According to one embodiment, the value of the single output pixel is equal to the average value of the input pixels.

Such a technical feature allows to acquire an output pixel whose value depicts the best the input pixels respective values, when the standard deviation value fulfill the homogeneity requirement set by the threshold value on homogeneity metric.

According to one embodiment, the method further comprises, before the step of calculating, of setting or modifying the threshold value for the homogeneity metric.

It is therefore possible for an operator to adapt the degree of homogeneity required to consider the captured image as homogeneous, and therefore to adapt the output data size reduction according to any specific need of the operator regarding the size and/or the quality expected on the output data.

According to one embodiment, the method further comprises, before the step of calculating, of correcting the input pixels based on pre-set corrective weights.

As pointed out above for a corresponding light field capture device according to the present disclosure, such a method is able to correct the vignetting effects of the light-field capture device.

In one embodiment, the method comprises a prior step of re-initializing the corrective weights.

Due to the fixed position of the macropixels on the photo-sensor, the vignetting effects and the corresponding corrective weights remain in theoretically unchanged, whatever the zoom/focus configuration adopted by the light-field capture device. In practice however, the implementation of a prior step of calibration allows adapting the corrective weights to the minor changes that may occur on the light-field capture device and affect the vignetting effects. As a matter of example, such minor changes may include the shift of a component compared to another during the assembling phase or the operational life of the light field capture device. The replacement of the initial main lens by another may also account for the implementation of a new calibration step.

In one embodiment, the output data of the at least one micro-lens comprise:
  a header indicating the number of output pixels,
  a body indicating the value of each output pixel.

The format of such output data has the advantage to be simple and easily computable.

According to another aspect of the invention there is provided a method for acquiring the output data of a scene, comprising:
  Implementing, for each micro-lens of the light-field capture device, the method for acquiring the output data of at least one micro-lens,
  Summing the output data respectively acquired from each micro-lens.

A further aspect of the invention concerns a computer program product, which comprises program code instructions for implementing the method for acquiring the output data of at least one micro-lens of a light-field capture device, when the program is executed on a computer or a processor.

A further aspect of the invention concerns a non-transitory computer-readable medium comprising a computer program product recorded thereon and capable of being run by a processor, including program code instructions for implementing a method for acquiring the output data of at least one micro-lens of a light-field capture device.

While not explicitly described, the present embodiments may be employed in any combination or sub-combination.

4. BRIEF DESCRIPTION OF THE DRAWINGS

The invention can be better understood with reference to the following description and drawings, given by way of example and not limiting the scope of protection, and in which.

The components in the figures are not necessarily to scale, emphasis instead being placed upon illustrating the principles of the disclosure.

5. DESCRIPTION OF EMBODIMENTS

The present disclosure relates to light-field capture devices, and to methods for acquiring output data, which embody a compressive sensing calculation unit. Many specific details of certain embodiments of the disclosure are set forth in the following description and in FIGS. 1 to 6 to provide a thorough understanding of such embodiments. One skilled in the art, however, will understand that the present disclosure may have additional embodiments, or may be practiced without several of the details described in the following description.

Figure 1:
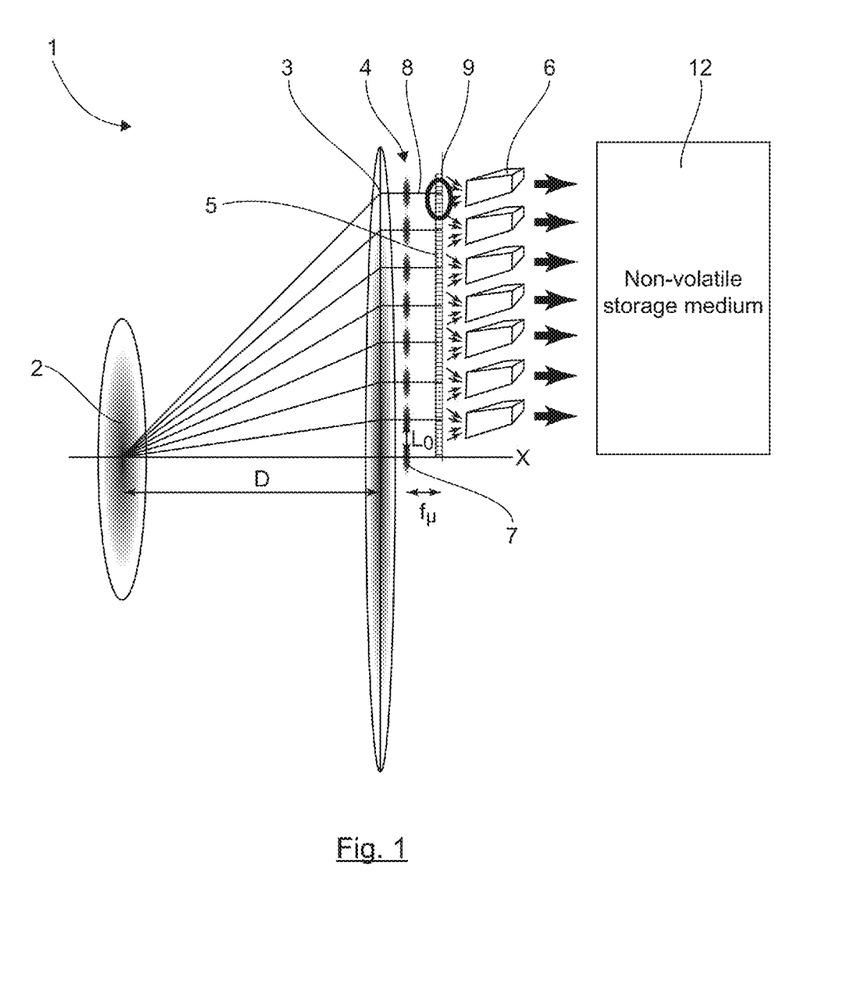
FIG. 1 is a schematic view of a light-field capture device according to one embodiment of the disclosure.

Description of a Plenoptic Camera:

FIG. 1 illustrates schematically an example of light-field capture device: a plenoptic camera 1. Such a camera 1 comprises a main lens 2, a field lens 3, a micro-lens array 4, a photo-sensor 5 and a compressive sensing calculation unit 6.

The main lens 2 receives light from a scene to capture (not shown) in an object field of the main lens 2 and renders the light through an image field of the main lens 2. In this example, the main lens 2 is embodied by a single lens that features an optical axis X, an entrance pupil turned towards the object focal plane of the main lens 2, and an exit pupil turned toward the image focal plane. However, one skilled in the art will understand that such a main lens may be embodied by an optical system comprising a set of lenses mounted one after the other to refract the light of the scene to capture. In such kind of configuration, the entrance pupil of the main lens 2 of the following description corresponds to the one of the first lens of the optical system to refract the coming light, and the exit pupil as described corresponds to the one of the lens that refracts this light in the image focal plane of the optical system.

A micro-lens array 4 is positioned in the image focal plane of the main lens 2. In another embodiment of the disclosure, the micro-lens array 4 is also positioned in the image focal field of the main lens 2, but before or behind the focal plane of the main lens 2. This micro-lens array 4 includes a plurality of circular micro-lenses 7 arranged in a two-dimensional (2D) array. In another embodiment, such micro-lenses have different shapes, e.g. elliptical, without departing from the scope of the disclosure. Each micro-lens 7 has the lens properties to direct the light of a corresponding micro-lens image (micro-image) 8 to a dedicated area on the photo-sensor 5, referred to as macropixel 9. Thus, the plenoptic camera 1 generates one micro-image 8 at each macropixel 9. In this example, the light-field capture device described is a plenoptic camera type 1, in which all the micro-lenses 7 have the same focal length $f_\mu$ and in which the micro-lens array is positioned one focal length away from the photo-sensor 5. In this configuration, each micro-image 8 depicts a certain area of the captured scene and each pixel of the macropixel 9 depicts this certain area from the point of view of a certain sub-aperture location on the main lens exit pupil. Such a configuration enables maximum angular resolution and low spatial resolution to be obtained. However, one skilled in the art will understand that in another embodiment of the disclosure, the photo-sensor 5 may be positioned at a distance from the micro-lens array 4 non-equal to one focal length $f_\mu$.

In this example, the photo-sensor 5 is of a CCD (Charge-Coupled Device) type using a CMOS (Complementary Metal Oxide Semiconductor) technology. However, one skilled in the art will understand that such a photo-sensor 5 may alternatively embody a neuromorphic spike based sensor (e.g. Artificial Silicon Retina) or any other type of photo-sensor known from the background art.

A varifocal field lens 3 is positioned in the image field of the main lens 2, between the main lens 2 and the micro-lens array 4. The focal length of this particular field lens is adaptable to match the distance D between the main lens 2 and the field lens 3, whatever the zoom/focus parameter of the camera. An exit pupil at infinity makes this field lens image-space telecentric, the light rays which pass through the center of the exit pupil (of the field lens) being parallel to the optical axis X. Thus, both the micro-lens array 4 and the photo-sensor 5 being respectively arranged on a different plane perpendicular to the optical axis X, the position on the photo-sensor 5 of each macropixel 9 is therefore set in time, whatever the zoom/focus configuration of the plenoptic camera.

One skilled in the art will understand that in the particular case of a plenoptic camera devoid of a zoom/focus ability, the implementation of a varifocal is not necessary to carry out the disclosure, since the position of the macropixels 9 on the photo-sensor 5 is by definition set in time.

The implementation of such a varifocal field lens 3 has several advantages. First, it enables an operator to know in advance the position of the macropixel centers on the photo-sensor 5. The implementation of a post-capture processing step of micro-image center mapping, as described in background art, is therefore no longer required, which contributes to the reduction of the computing load of the post-capture image processing. In addition, the drops of light intensity occurring on the edges of the main lens aperture (also called "vignetting effect") remain invariable in time, due to the fixed position of the macropixels 9 on the photo-sensor 5. Thus, the corresponding corrective weights do not have to be re-estimated or approximated before each light-field image capture. As a matter of example, such corrective weights are measured in a calibration pre-capture step, and then applied to all the further captures made with the plenoptic camera, whatever the zoom/focus configuration adopted by the operator. While increasing the light-field capture speed, the implementation of a varifocal field lens 3 also enables the implementation of a vignetting correction step, prior to the acquisition of the output data, as described in the following description.

By knowing in advance the future position of each micro-image on the photo-sensor 5, it is possible to adapt the structure of the camera accordingly. In this embodiment of the disclosure, each macropixel 9 of the photo-sensor 5 is individually connected, e.g. by means of a wire, to a dedicated compressive sensing calculation unit 6. Thus, there are as many compressive sensing calculation units 6 as macropixels 9 on the photo-sensor 5. In such a configuration, the complexity of the algorithm targeted to correct the vignetting effects is low. The processing unit of such a compressive sensing calculation unit 6 is therefore not complex and easily programmable. One skilled in the art will understand that in another embodiment, such a compressive sensing calculation unit 6 may be shared between several macropixels 9, either in part or in its entirety. According to this embodiment, the number of calculation units is reduced. In return, the compressive sensing calculation units 6 have to handle more data and be fast enough to perform real-time calculations all over the photo-sensor 5. In a particular embodiment of the disclosure, the plenoptic camera comprises a single compressive sensing calculation unit 6, which is individually connected to each of the macropixels.

Figure 2:
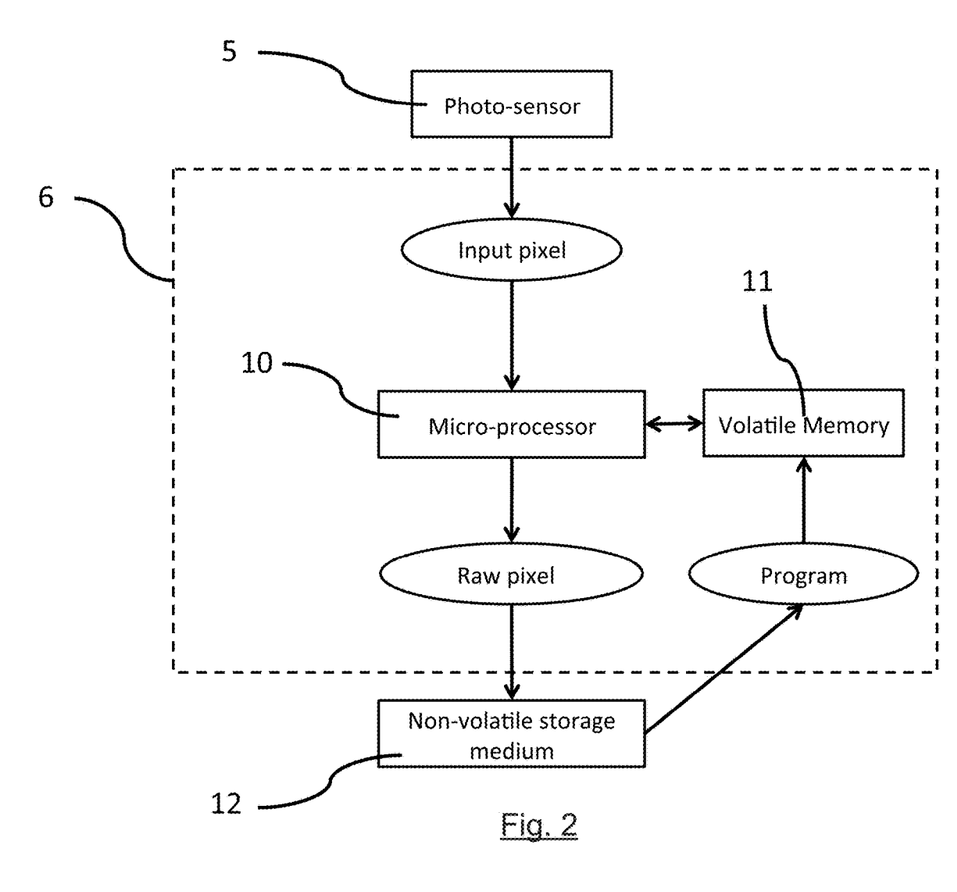
FIG. 2 is a schematic view of a compressive sensing calculation unit of a light-field capture device, according to one embodiment of the disclosure.

FIG. 2 illustrates schematically an example of compressive sensing calculation unit 6. Such a compressive sensing calculation unit 6 comprises a microprocessor 10 a volatile memory 11, and is connectable to a non-volatile storage medium 12. The microprocessor 10 is configured to execute program code instructions enabling implementation of at least one part of the steps of the compressive sensing method described here below with reference to FIG. 3.

The non-volatile storage medium 12, e.g. a hard disk, is a computer-readable carrier medium. The non-volatile storage medium 12 enables several data to be stored, among which:

The executable program code instructions, which are executed by the microprocessor 10 to enable implementation of the method described here below,
The corrective weights that model the vignetting of the main lens 2 for each of the micro-lenses 7,
A threshold value on the homogeneity metric H of each micro-image 8,
The output data 13 acquired from each macropixel 9.

The volatile memory 11, e.g. a random access memory (RAM), includes registers that enable to store temporary:
The input pixels captured for each macropixel 9,
The executable program code instructions,
The variables and parameters required for this execution.

Figure 3:
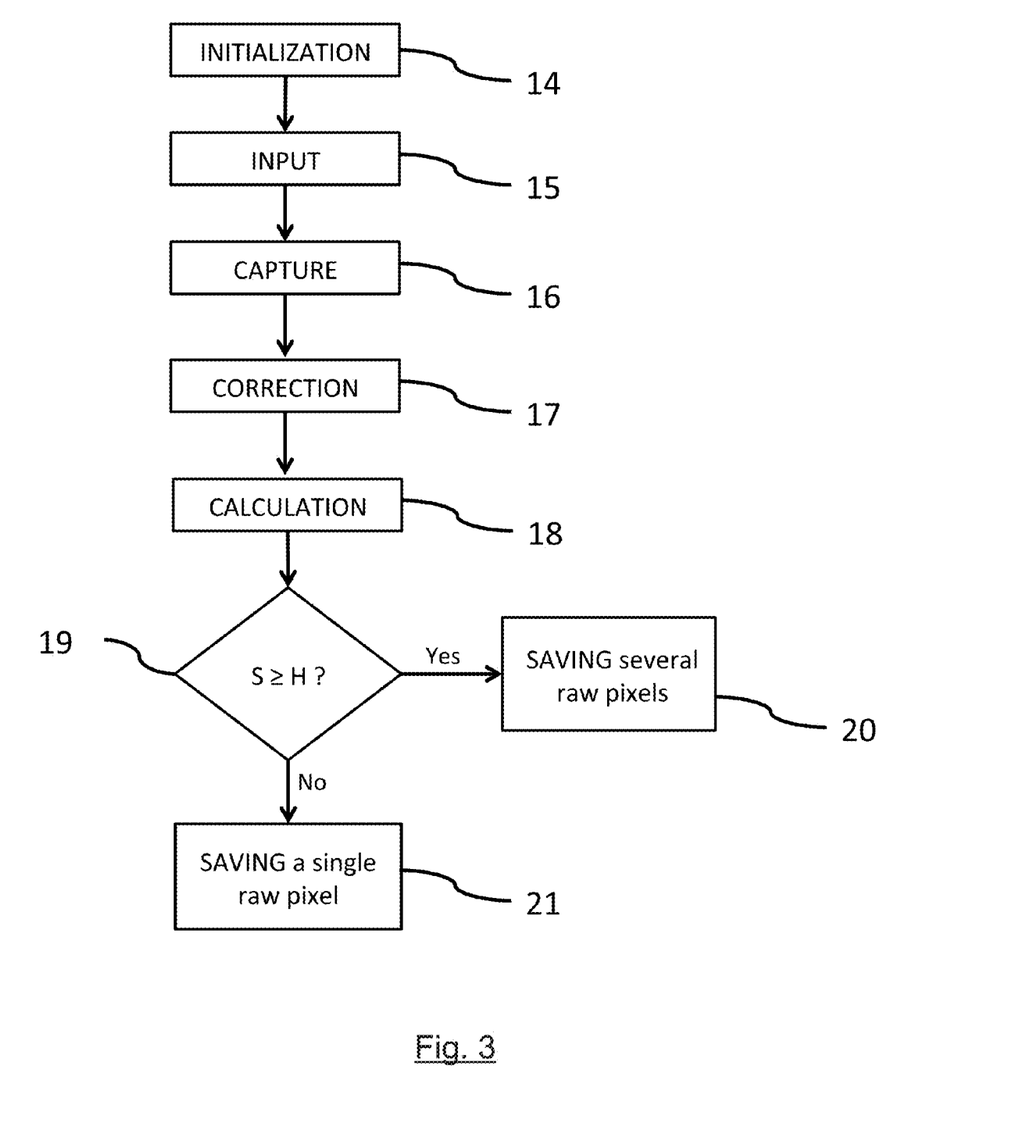
FIG. 3 is a flow chart of the successive steps implemented when performing a method for acquiring output data, according to one embodiment of the disclosure.

Description of a Compressive Sensing Method for Acquiring Output Data:

FIG. 3 illustrates in more detail the successive steps implemented by the method for acquiring the output data 13 of at least one micro-lens 7 of the light-field capture device 1 according to one embodiment of the disclosure.

Following the initialization step 14, the program runs the step INPUT 15 that offers to the operator the possibility to re-initialize the values of:
The corrective weights of each of the micro-lenses 7,
A threshold value on the homogeneity metric of each micro-image.

In another embodiment of the disclosure, these data are pre-set in the non-volatile storage medium 12 and the program only allows re-initializing them upon request.

The program code instructions, the corrective weights, and the threshold value on the homogeneity metric H are then transferred from the non-volatile storage medium 12 to the volatile memory 11 so as to be executed by the microprocessor 10.

Following the step INPUT 15, the program offers the operator the possibility of initiating the step CAPTURE 16, which consists in saving on the volatile memory 11 of each compressive sensing calculation unit 6 the input pixels of the corresponding macropixel 9.

Following the step CAPTURE 16, the program runs the step CORRECTION 17, which consists in correcting the values of the input pixels captured based on the corrective weights pre-stored in the volatile memory 11.

Following the step CORRECTION 17, the program runs the step CALCULATION 18, which comprises obtaining homogeneity data representative of the homogenity of the input pixels, by for example calculating the standard deviation S of the input pixels.

In this example, the standard deviation S may be expressed as:

$$S = \sqrt{\frac{\sum_N (d - d^s)^2}{N}}$$

Wherein N is the number of input pixels, d is the value of each input pixel, and $d^S$ is the average value of the input pixels.

The calculated standard deviation S depicts the homogeneity of the scene captured by the targeted macropixel 9 and the corresponding micro-lens 7.

In another embodiment, this standard deviation S may be calculated based on a slightly different algorithm, which could potentially be reprogrammable by an operator, when running the step INPUT 15.

In one particular embodiment, a plurality of standard deviation values S are separately estimated on every color channel of a macropixel 9, for example in presence of Bayer pattern on the photo-sensor 5 or in presence of a 3(three)-channel acquisition photo-sensor, to account for the color filter transmittances. Therefore, for every macropixel 9, three standard deviations S are calculated. Each is then thresholded according to a channel dependent threshold value on a homogeneity metric H. The thresholded values are then summed to decide whether the macropixel 9 contains high homogeneity in at least one channel.

The value of the calculated standard deviation S is compared to the threshold value on the homogeneity metric H pre-stored in the volatile memory 11.

If (step 19) the standard deviation S is equal to or greater than the threshold value H, all the corrected input pixels are saved as output pixels (step 20) on the non-volatile storage medium 12, forming the output data of the targeted macropixel 9.

If (step 19) the standard deviation S is lower than the threshold value H, only one pixel value is saved as output pixel (step 21) on the non-volatile storage medium 12, thereby forming the output data of the targeted macropixel 9. The value of this single output pixel is equal to the average value of the input pixels of the targeted macropixel 9.

The output data acquired by the plenoptic camera 1 are then the sum of the output data acquired from each macropixel 9 of the photo-sensor 5.

In this example, the output data 13 acquired comprise both a header indicating the number of output pixels, and a body indicating the value of the output pixels. This image format has the advantage of being simple and easily computable. One skilled in the art will understand that this image format may be replaced in another embodiment of the disclosure by another image format, known from the background art.

The advantage of the method is to reduce the redundancy of the light-field data, and therefore the size of the output data acquired, while efficiently representing the information captured for each macropixel 9.

In another embodiment of the disclosure, the program runs a step of calibration, prior to the step CAPTURE 16. This additional step aims to re-initialize the vignetting corrective weights corresponding to each of the micro-lenses 7. For this step, the threshold value H is set to "0" and the corrective weights are all initialized by "1". An image of a white diffuser is captured. Since each micro-lens captures the vignetting effect occurring at the edges of the main lens 2, the estimated homogeneity of each micro-lens is greater than the threshold (set to 0). Therefore, all of the input pixels are saved as output pixels. The acquired output data provide the intensity modulations that are introduced by the vignetting of the main lens 2. Therefore, the final corrective weights can be set to the inverse of the captured pixels of each macropixel 9 and stored in the volatile memory 11 of the corresponding compressive sensing calculation unit 6.

Figure 4:
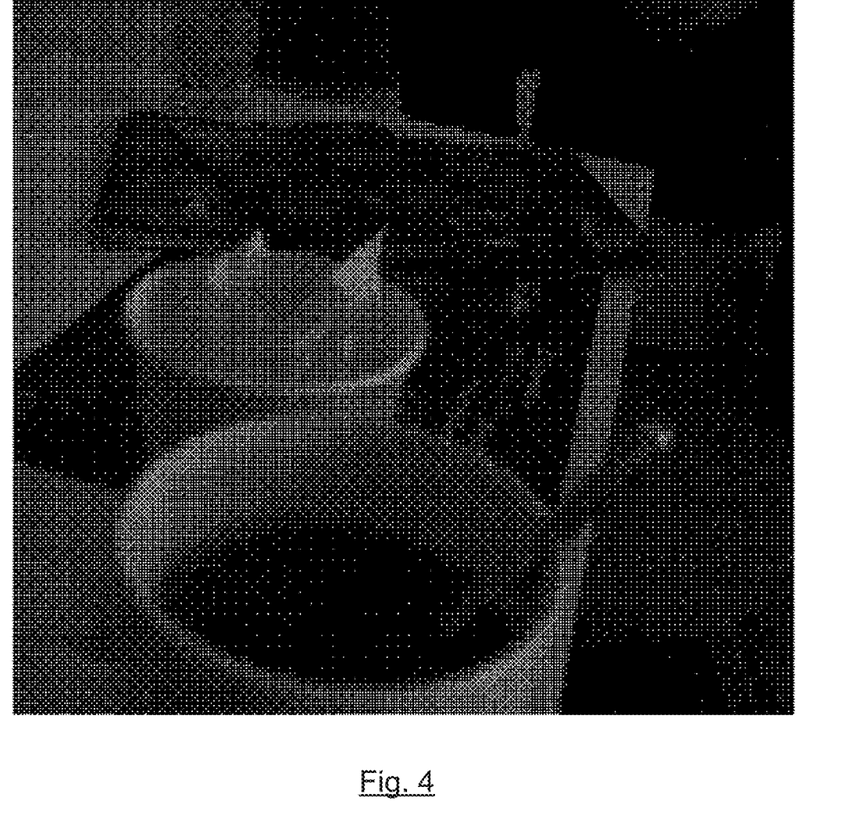
FIG. 4 is an example of image captured with a plenoptic camera of the background art.
Figure 5:
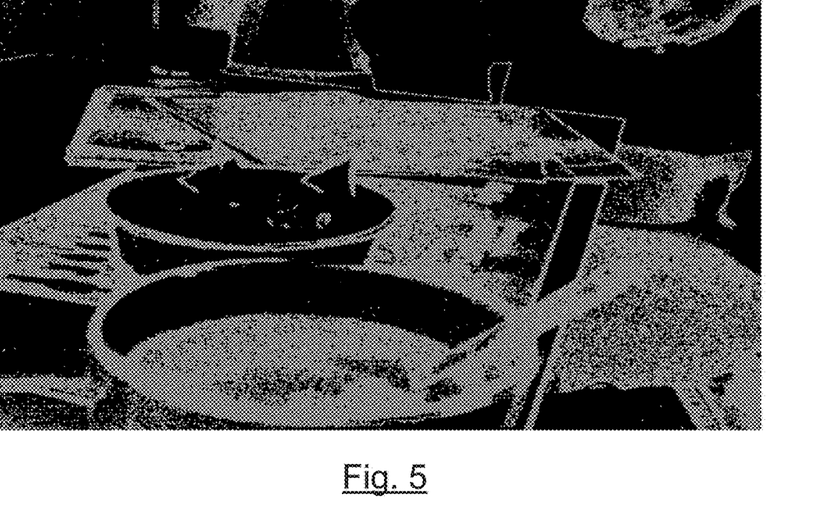
FIG. 5 is an example of output data acquired through the implementation of a method according to one embodiment of the disclosure.
Figure 6:
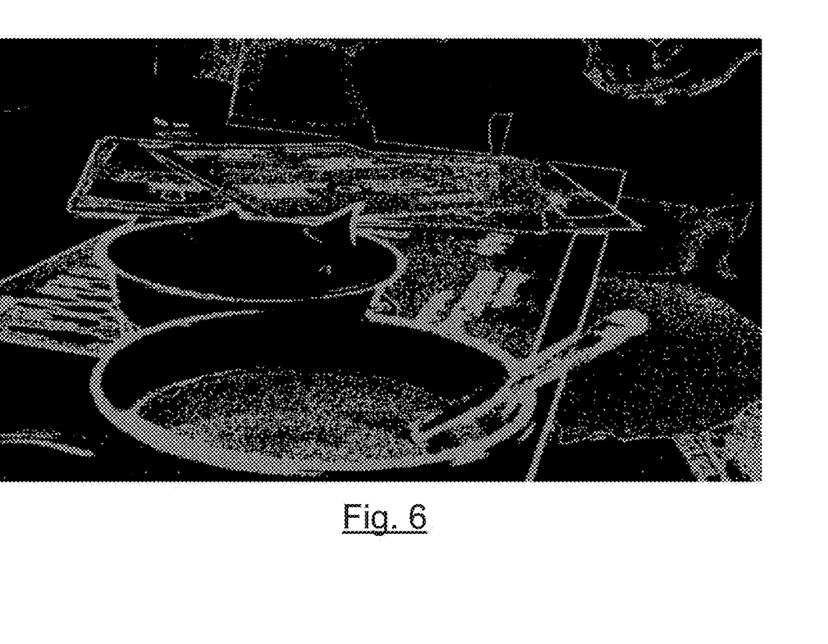
FIG. 6 is an example of compressive output data acquired through the implementation of a method according to one embodiment of the disclosure.

One example on experimental data is shown in FIGS. 4, 5 and 6. The standard deviations D of the micro-lens images 8 are calculated and thresholded to determine the number of micro-lens images that depict homogeneous areas of the scene as captured without compressive sensing implementation (as illustrated by FIG. 4).

In FIG. 5, the micro-lens images that contain high frequency information of the scene are illustrated with a white point. Each macropixel is depicted using a single pixel. The corresponding measurement shows that for a threshold value H of 10% of the pixel range, the percentage of non-uniform micro-lens image is equal to 43,0675%, while retaining information. Thus, we only require saving and transmitting 50% of the captured data to provide the same information, the rest being redundant. The size of the output data is therefore half the size of the captured input data.

The reduction in size of the output data can be increased as desired. Following the same scheme, the value of the threshold H is increased to 50% of the pixel range to obtain good quality output data (illustrated in FIG. 6) of reduced size, with a percentage of non-uniform micro-lens image equal to 23,4409%. In this example, the file size is reduced to one fourth.

As will be appreciated by one skilled in the art, aspects of the present principles can be embodied as a system, method or computer readable medium. Accordingly, aspects of the present principles can take the form of an entirely hardware embodiment, an entirely software embodiment (including firmware, resident software, micro-code, and so forth), or an embodiment combining software and hardware aspects.

When the present principles are implemented by one or several hardware components, it can be noted that an hardware component comprises a processor that is an integrated circuit such as a central processing unit, and/or a microprocessor, and/or an Application-specific integrated circuit (ASIC), and/or an Application-specific instruction-set processor (ASIP), and/or a graphics processing unit (GPU), and/or a physics processing unit (PPU), and/or a digital signal processor (DSP), and/or an image processor, and/or a coprocessor, and/or a floating-point unit, and/or a network processor, and/or an audio processor, and/or a multi-core processor. Moreover, the hardware component can also comprise a baseband processor (comprising for example memory units, and a firmware) and/or radio electronic circuits (that can comprise antennas), which receive or transmit radio signals. In one embodiment, the hardware component is compliant with one or more standards such as ISO/IEC 18092/ECMA-340, ISO/IEC 21481/ECMA-352, GSMA, StoLPaN, ETSI/SCP (Smart Card Platform), GlobalPlatform (i.e. a secure element). In a variant, the hardware component is a Radio-frequency identification (RFID) tag. In one embodiment, a hardware component comprises circuits that enable Bluetooth communications, and/or Wi-fi communications, and/or Zigbee communications, and/or USB communications and/or Firewire communications and/or NFC (for Near Field) communications.

Furthermore, aspects of the present principles can take the form of a computer readable storage medium. Any combination of one or more computer readable storage medium(s) may be utilized.

Thus for example, it will be appreciated that any flow charts, flow diagrams, state transition diagrams, pseudo code, and the like represent various processes which may be substantially represented in computer readable storage media and so executed by a computer or a processor, whether or not such computer or processor is explicitly shown.

Although the present disclosure has been described with reference to one or more examples, workers skilled in the art will recognize that changes may be made in form and detail without departing from the scope of the disclosure and/or the appended claims.

The invention claimed is:
1. A light-field capture device comprising:
a photo-sensor,
a main lens configured to refract light from a scene towards an image focal field,
a micro-lens array positioned in the image focal field between the main lens and the photo-sensor, each micro-lens being configured to project a micro-lens image onto a respective area of the photo-sensor; wherein the light-field capture device comprises at least one calculation unit connected to at least one of the respective areas and configured to obtain homogeneity data representative of the homogeneity of input pixels of said respective area, and to provide, based on the homogeneity data, output data representative of the input pixels of said respective area; the output data comprising either a number of output pixels corresponding to the number of input pixels, or a single output pixel, depending on a comparison of the homogeneity data with a homogeneity threshold,
a field lens positioned between the main lens and the micro-lens array, said field lens being configured to set the angle of refraction of the light refracted by the field lens, said field lens comprising a varifocal lens that is configured to adapt its object focal length to match a distance between the main lens and the varifocal lens; and
wherein light rays that pass through a center of an aperture of the varifocal lens are parallel to an optical axis behind the varifocal lens, wherein the light rays refracted by the micro-lens are parallel to the optical axis and perpendicular to the photo-sensor.

2. The light field capture device according to claim 1, wherein the homogeneity data corresponds to the standard deviation of the input pixels.

3. The light field capture device according to claim 1, wherein the at least one compressive sensing calculation unit is further configured to correct the vignetting effects of the light-field capture device.

4. The light field capture device according to claim 1, wherein the photo-sensor is positioned at one image focal length ($f_\mu$) from the micro-lens array.

5. The light-field capture device according to claim 1, comprising a plurality of compressive sensing calculation units, wherein each compressive sensing calculation unit is connected to a single dedicated area.

6. The light field capture device according to claim 1, wherein at least one compressive sensing calculation unit is individually connected to a plurality of dedicated areas of the photo-sensor.

7. A method for acquiring output data from a number of input pixels of a photo-sensor of a light-field capture device, said light-field capture device comprising a main lens configured to refract light from a scene towards an image focal field, a microlens array positioned in the image focal field between the main lens and the photo-sensor, a field lens positioned between the main lens and the microlens array, said field lens being configured to set the angle of refraction of the light refracted by the field lens, said field lens comprising a varifocal lens that is configured to adapt its object focal length to match a distance between the main lens and the varifocal lens,
the method comprising:
    obtaining homogeneity data representative of the homogeneity of the input pixels to provide output data representative of the input pixels, wherein
    in the case where the homogeneity data is equal to or greater than a threshold, the output data comprising a number of output pixels corresponding to the number of input pixels when the homogeneity data is equal to or greater than a threshold, otherwise, in the case where the homogeneity data is less than the threshold, the output data comprising a single output pixel representative of the input pixels when the homogeneity data is less than the threshold;
    wherein light rays that pass through a center of an aperture of the varifocal lens are parallel to an optical axis behind the varifocal lens, wherein the light rays refracted by the microlens are parallel to the optical axis and perpendicular to the photo-sensor.

8. The method according to claim 7 wherein obtaining the homogeneity data comprises calculating the standard deviation of the input pixels.

9. The method according to claim 7, wherein the value of the single output pixel is representative of the average value of the input pixels.

10. The method according to claim 7, further comprising, before obtaining the homogeneity data, correcting the input pixels based on pre-set corrective weights.

11. The method according to claim 7, wherein the output data comprise:
    a header indicating the number of output pixels,
    a body indicating the value of each output pixel.

12. A non-transitory computer-readable medium comprising a computer program product recorded thereon and capable of being run by a processor, including program code instructions for implementing a method for acquiring output data from a number of input pixels of a photo-sensor of a light-field capture device, said light-field capture device comprising a main lens configured to refract light from a scene towards an image focal field, a microlens array positioned in the image focal field between the main lens and the photo-sensor, a field lens positioned between the main lens and the microlens array, said field lens being configured to set the angle of refraction of the light refracted by the field lens, said field lens comprising a varifocal lens that is configured to adapt its object focal length to match a distance between the main lens and the varifocal lens,
the method comprising:
    obtaining homogeneity data representative of the homogeneity of the input pixels to provide output data representative of the input pixels, wherein
    in the case where the homogeneity data is equal to or greater than a threshold, the output data comprising a number of output pixels corresponding to the number of input pixels when the homogeneity data is equal to or greater than a threshold, otherwise, in the case where the homogeneity data is less than the threshold, the output data comprising a single output pixel representative of the input pixels when the homogeneity data is less than the threshold;
    wherein light rays that pass through a center of an aperture of the varifocal lens are parallel to an optical axis behind the varifocal lens, wherein the light rays refracted by the microlens are parallel to the optical axis and perpendicular to the photo-sensor.

* * * * *